United States Patent [19]

Obara et al.

[11] Patent Number: 4,783,583
[45] Date of Patent: Nov. 8, 1988

[54] ELECTRIC DISCHARGE MACHINING APPARATUS OF WIRE-CUTTING TYPE

[75] Inventors: Haruki Obara, Sagamihara; Toshiyuki Aso, Hino; Hiroshi Kinoshita; Tamotsu Ishibashi, both of Hachioji, all of Japan

[73] Assignee: Fanuc Ltd., Yamanashi, Japan

[21] Appl. No.: 31,071

[22] PCT Filed: Jul. 18, 1986

[86] PCT No.: PCT/JP86/00372

§ 371 Date: May 19, 1987

§ 102(e) Date: May 19, 1987

[87] PCT Pub. No.: WO87/00467

PCT Pub. Date: Jan. 29, 1987

[30] Foreign Application Priority Data

Jul. 19, 1985 [JP] Japan ............... 60-158348

[51] Int. Cl.⁴ .................. B23H 7/02; B23H 7/10
[52] U.S. Cl. .................... 219/69 W; 204/206
[58] Field of Search .............. 219/69 W; 140/139; 204/206, 224 M; 83/926 B

[56] References Cited

U.S. PATENT DOCUMENTS

| | | | |
|---|---|---|---|
| 3,891,819 | 6/1975 | Ullmann et al. | 219/69 W |
| 3,987,270 | 10/1976 | Ullmann et al. | 219/69 W |
| 4,338,505 | 7/1982 | Katsube et al. | 219/69 W |
| 4,412,118 | 10/1983 | Nomura et al. | 219/69 W |
| 4,427,870 | 1/1984 | Inoue | 219/69 W |
| 4,523,074 | 6/1985 | Okuda | 219/69 W |
| 4,547,647 | 10/1985 | Schneider | 219/69 W |
| 4,618,761 | 10/1986 | Inoue et al. | 219/69 W |
| 4,628,172 | 12/1986 | Inoue | 219/69 W |
| 4,698,476 | 10/1987 | Yamamoto et al. | 219/69 W |

FOREIGN PATENT DOCUMENTS

| | | | |
|---|---|---|---|
| 56-9134 | 1/1981 | Japan . | |
| 56-27741 | 3/1981 | Japan . | |
| 56-82134 | 7/1981 | Japan | 219/69 W |
| 149124 | 9/1982 | Japan | 219/69 W |
| 58-206319 | 12/1983 | Japan . | |
| 186322 | 9/1985 | Japan | 219/69 W |
| 61-14817 | 1/1986 | Japan . | |

Primary Examiner—A. D. Pellinen
Assistant Examiner—Geoffrey S. Evans
Attorney, Agent, or Firm—Armstrong, Nikaido, Marmelstein & Kubovcik

[57] ABSTRACT

The electric discharge machining apparatus of the wire-cutting type comprises a wire-treating unit (48) movable in the horizonal direction relative to an upper wire guide member (12) between the upper wire guide member and a work table (10) to traverse a wire electrode (W) extending downward from a wire passage (13) of the upper wire guide member. The wire-treating unit has a base block (55) and a movable block (56) that can approach to and separate from the base block to define a slit (60) and a nozzle hole (61) that can be opened and closed between the two blocks. The slit extends in the horizontal moving direction of the wire-treating unit to receive the wire electrode therein. The nozzle hole can be connected to the lower end of the wire passage of the upper wire guide member, and the nozzle hole is constructed so that a spray liquid supplied into the wire passage of the upper wire guide member can be injected into a wire passage (15) of a lower wire guide member (14). The wire-treating unit comprises a wire-detecting device (66) for detecting the end of the wire electrode between the base block and the movable block and wire-cutting means (62) for cutting the wire electrode between the base block and the movable block.

15 Claims, 7 Drawing Sheets

ELECTRIC DISCHARGE MACHINING APPARATUS OF WIRE-CUTTING TYPE

TECHNICAL FIELD

The present invention relates to an electric discharge machining appratus of the wire-cutting type for machining a work piced by utilizing an electric discharge between a wire electrode and the work piece. More particularly, the present invention relates to an improvement of an automatic tension mechanism of a wire electrode.

BACKGROUND ART

An electric discharge machining apparatus of the wire-cutting type for machining a work piece by utilizing an electric discharge between a wire electrode and the work piece to be machined in known. In general, the conventional electric discharge machining apparatus of the wire-cutting type comprises an upper wire guide member for guiding a wire electrode above a work table for holding a work piece thereon and a lower wire guide member for guiding the wire electrode below the work table. For the electric discharge machining operation, the wire elect rode is tightly string between the upper wire gude member and the lower wire gude member, and the wire electode is continuously fed downward by a wire feed device arranged above the upper wire guide member. In this conventional electric deischarge machining apparatus of the wire-cutting type, where it is necessary to change the electric discharge machining position, the wire electrode must be once cut between the upper and lower wire guide members and the wire electrode automatically string between the upper and lower wire guide members again. Furthermore, where the wire electrode is broken in the discharge region by abnormal electric dischargeing or the like, the broken end of the wire electrode must be pulled up from the discharge region, the readily bending portion or the surface-roughened portion of the wire electrode cut out, and the wire electrode then automatically string between the upper wire guide member and the lower wire guide member. Accordingly, in the conventional electric discharge machining apparatus of the wire-cutting type, a wire-cutting device is disposed above or below the upper wire guide member.

In the conventional electric discharge machining apparatus of the wire-cutting type in which the wire-cutting device is disposed above the upper wire guide member, the lower end, that is, the free end, of the cut wire electrode is fed downward by the wire feed device. The free end of the wire electrode is readily caught in narrow wire passages of the upper and lower wire guide members or in holes or grooves of the work piece, and therefore, it is difficult to perform automatic stringing of the wire electrode accurately In the electric discharge machining apparatus of the wire-cutting type in which the wire-cutting device is disposed below the upper wire guide member, it is difficult to smoothly pass the free end of the wire electrode through the holes or grooves of the work piece or the narrow passage of the lower wire guide member.

DISCLOSURE OF THE INVENTION

In accordance with the present invention, there is provided an electric discharge machining apparatus of the wire-cutting type, which comprises a work table for holding a work piece thereon, upper and lower wire guide members arranged above and below the work table, each having a wire passage perforated in the vertical direction, means for supplying a wire electrode to be passed through the wire passages of the upper and lower wire guide members, a wire feed device disposed above the upper wire guide member to give downward and upward feeds to the wire electrode, spray liquid feed means for feeding a spray liquid into the wire passage of the upper wire guide member, and a wire-treating unit movable in the horizontal direction relative to the upper wire guide member between the upper wire guide member and the work table to traverse the wire electrode extending downward from the wire passage of the upper wire guide member, wherein the wire-treating unit has a base block and a movable block which can approach to and separate from the base block to define a slit and a nozzle hole that can be opened and closed between said two blocks, the nozzle hole can be connected to the lower end of the wire passage of the upper wire guide member and is constructed so that the spray liquid supplied in the wire passage of the upper wire guide member is injected toward the wire passage of the upper wire guide member, and the wire-treating unit comprises wire-detecting means for detecting the end of the wire electrode extending downward from the wire passage of the upper wire guide member between the base block and the movable block and wire-cutting means for cutting the wire electrode between the base block and the movable block.

In the above-mentioned apparatus of the present invention, at the time of the electric discharge machining operation, the wire-treating unit stands by on the side of the wire electrode string between the upper wire guide member and the lower wire guide member. When it is necessary to cut the wire electrode and string it again, the wire-treating unit is actuated and the wire electrode is cut by the wire-cutting means of the unit. Then, the nozzle hole of the unit is connected to the lower end of the wire passage of the upper wire guide member to close the slit, and the nozzle hole is brought to the state where only the upper and lower ends thereof are opened. Then, the spray liquid is supplied into the wire passage of the upper wire guide member. The spray liquid is injected downward from the wire passage of the upper wire guide member through the nozzle hole and the wire electrode is fed out downward by the injecting force of the spray liquid. The wire electrode is passed through the machining-initiating hole or groove of the work piece by the restraint of the injecting force of the spray liquid and is passed through the wire passage of the lower wire guide member. Accordingly, automatic stringing of the wire electrode can be accurately performed.

BRIEF DESCRIPTION OF THE DRAWINGS

The above-mentioned and other characteristics and advantages of the present invention will become more apparent from the following detailed description made with reference to the accompanying drawings, in which.

BEST MODE FOR CARRYING OUT THE INVENTION

Figure 1:
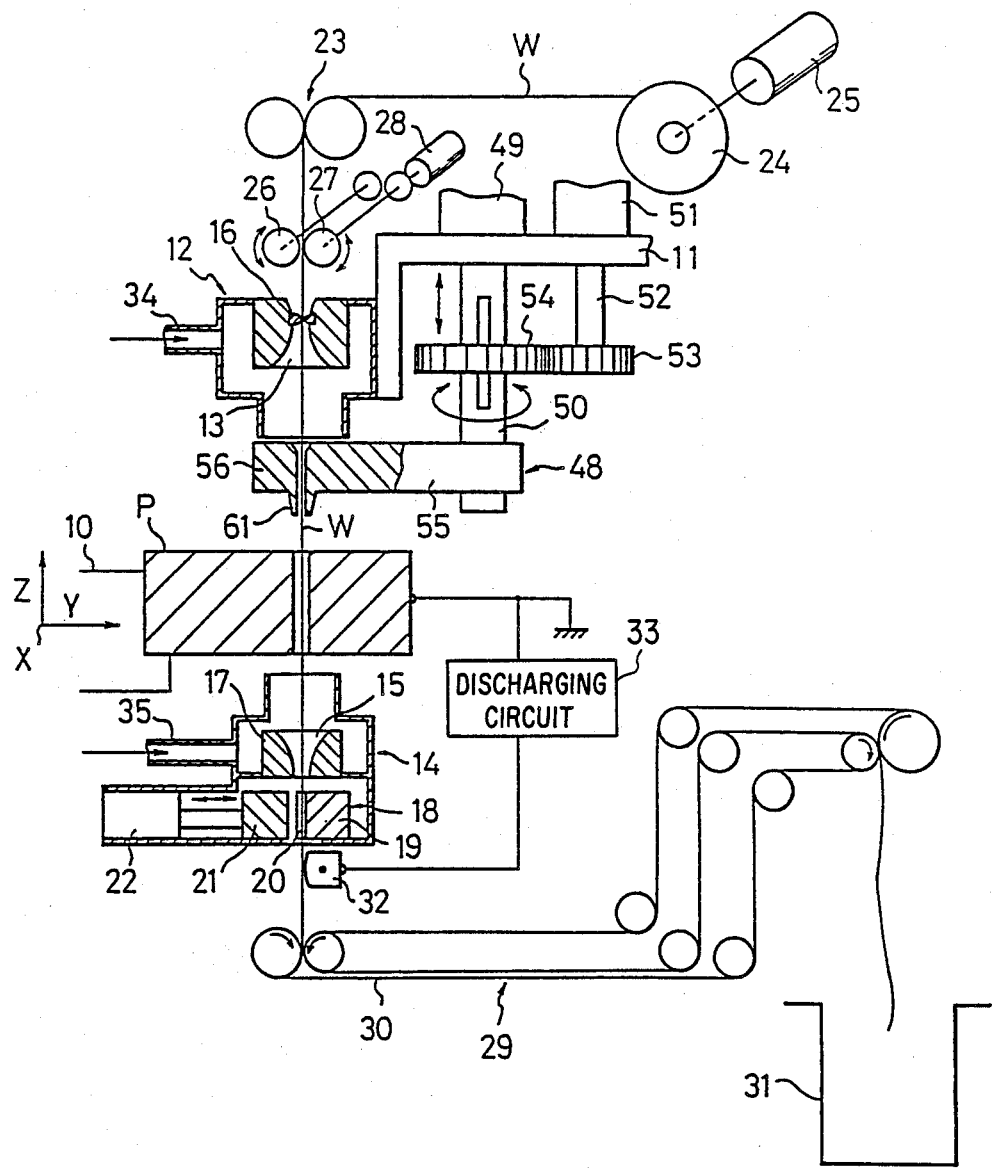
FIG. 1 is a sectional view of a schematic structure of an electric discharge machining apparatus of the wire-cutting type, which illustrates a first embodiment of the present invention.

FIGS. 1 through 7 illustrate the first embodiment of the present invention. Referring to FIG. 1, the electric discharge machining apparatus of the wire-cutting type comprises a work table 10 for holding a work piece P thereon. The work table 10 is arranged to be movable in the directions of orthogonal axes X and Y horizontal to a base frame (not shown). An upper wire guide member 12 having a wire passage 13 perforated in the vertical direction is arranged above the work table 10, and the lower wire guide member 14 having a wire passage 15 perforated in the vertical direction is arranged below the work table 10. The lower wire guide member 14 is secured to the base frame supporting the work table 10, and the upper wire guide member 12 is attached to a supporting frame 11 which is mounted on the base frame to be movable in the directions of the axes X and Y and in the direction of the vertical axis Z.

A jewel guide 16 having a small hole for precisely positioning a wire electrode W is mounted on the upper wire guide member 12, and the diameter of the wire passage 13 on the lower side of the jewel guide 16 is greatly expanded downward. The lower wire guide member 14 is provided with a guide block 17 having a relatively wide opening 15 expanded upward and a three-point supporting guide mechanism 18 arranged below the guide block 17. The three-point supporting guide 18 is provided with a stationary block having a V-figured groove 20 extending straight in the vertical direction and a movable block 21 advanced and retracted relative to the stationary block 19 by an operating member 22 such as a solenoid. When the work piece P is vertically machined, the wire electrode W is vertically supported at three points by the V-figured groove 20 of the stationary block 19 and the movable block 21, and when the work piece P is subjected to the taper machining, the wire electrode W is guided along the curved face of the guide block 17.

A wire feed device 23 is disposed above the upper wire guide member 12. The wire feed device 23 comprises a pair of wire feed rollers 26 and 27 gripping the wire electrode W above the upper wire guide member 12 and a motor 28 for rotating and driving the wire feed rollers 26 and 27 in normal and reverse directions. The wire electrode W is wound on a wire reel 24 rotated and driven in normal and reverse directions by a motor 25.

A wire recovery device 29 for recovering the wire electrode W, which has passed through the wire passage 15, is arranged below the lower wire guide member 14. The wire recovery device 29 is provided with a belt delivery device 30 for gripping and feeding the wire electrode W to a recovery box 31.

Upon the electric discharge machining operation, the wire electrode W is continuously fed out downward by the wire feed rollers 26 and 27, passed through the interior of the wire passage 13 of the upper wire guide member 12, passed through a machining hole or groove of the work piece P, further passed through the nterior of the wire passage 15 of the lower wire guide member 14, and introduced into the belt delivery device 30 of the wire recovery device 29. On the other hand, when the wire electrode W is broken during the electric discharge machining operation by abnormal discharge, the broken end of the wire electrode W is pulled up above the work piece P by the wire feed rollers 26 and 27.

In this embodiment, an electric supply contact element 32 is disposed between the lower wire guide member 14 and the wire recovery device 29. One end of a discharging circuit 33 is connected to the wire electrode W string between the wire guide members 12 and 14 through the electric supply contact element 32, and the other end of the discharging circuit 33 is connected to the earthed work piece P.

Spray liquid supply pipes 34 and 35 for supplying a spraying liquid into the wire passages 13 and 15 are connected to the upper wire guide member 12 and the lower wire guide member 14, respectively. At the begining of electic discharge machining operation, the spray liquid is supplied to the wire passage 13 of the upper wire guide member 12 and the wire passage 15 of the lower wire guide member 14. The spray liquid supplied to the wire passages 13 and 15 is injected toward the work piece P to cool the work piece P and the wire electrode W. The work piece P is machined by stable aquatic electric discharge caused between the work piece P and the wire electrode W.

Figure 2:
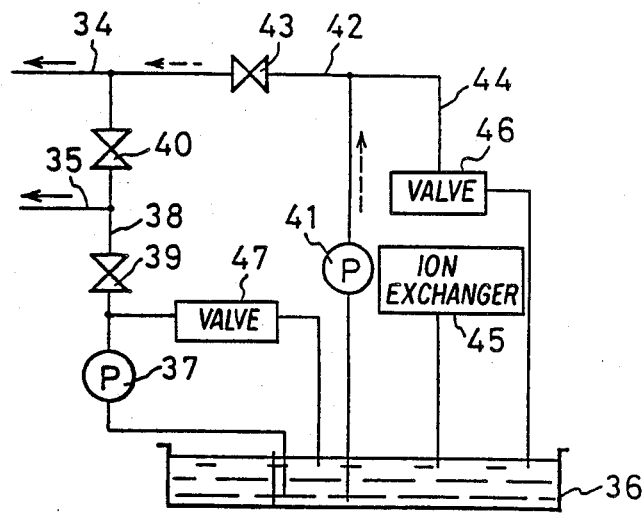
FIG. 2 is a flow chart of a spray liquid supply system used in the electric discharge machining apparatus shown in FIG. 1.

Referring to FIG. 2, first and second opening and closing valves, for example, manual valves 39 and 40, are arranged in a discharge side pipe passage 38 of a first pump 37 for withdrawing out the spray liquid in a liquid tank 36, for example, water, and the spray liquid supply pipe 35 branched from the discharge side pipe passage 38 between both the opening and closing valves 39 and 40 is connected to the lower wire guide member 14 and the spray liquid supply pipe 34 connected to the downstream side of the second opening and closing valve 40 located on the downstream side is connected to the upper wire guide member 12. An a discharge side pipe passage 42 of a second pump 41 is connected to the downstream side of the second opening and closing valve 40 through a third opening and closing valve, for example, an electromagnetic opening and closing valve 43. An ion exchanger 45 and a changeover valve 46 for the ion exchanger are arranged in a by-pass pipe 44.

During the electric discharge machining operation, the third opening and closing valve 43 is closed, and the spray liquid discharged from the first pump 37 is supplied to the wire passages 13 and 15 of the guide units 12 and 14 through the supply pipes 34 and 35. On the other hand, at the time of automatic stringing of the wire electrode described hereinafter, the third opening and closing valve 43 is opened and the first and second opening and closing valves 39 and 40 are closed, and the spray liquid discharged from the second pump 41 is supplied only to the wire passage 13 of the upper wire guide member 12 through the third opening and closing valve 43 and the supply pipe 34. At this point, the spray liquid discharged from the first pump 37 is returned into the tank 35 by a relief valve 47.

Figure 3:
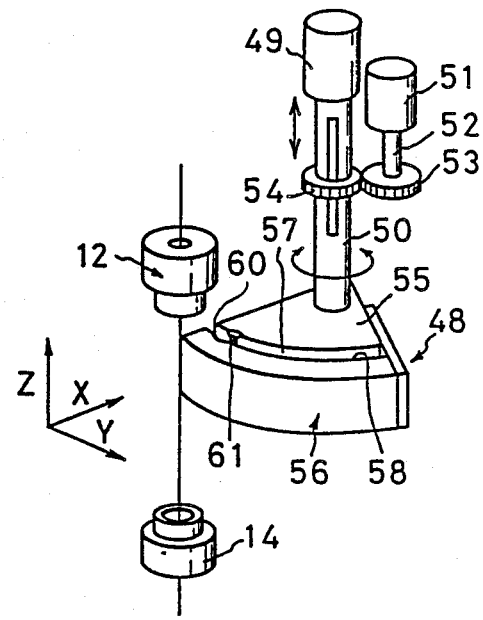
FIG. 3 is a schematic perspective view showing a portion surrounding a wire-treating unit of the electric discharge machining apparatus shown in FIG. 1.
Figure 4:
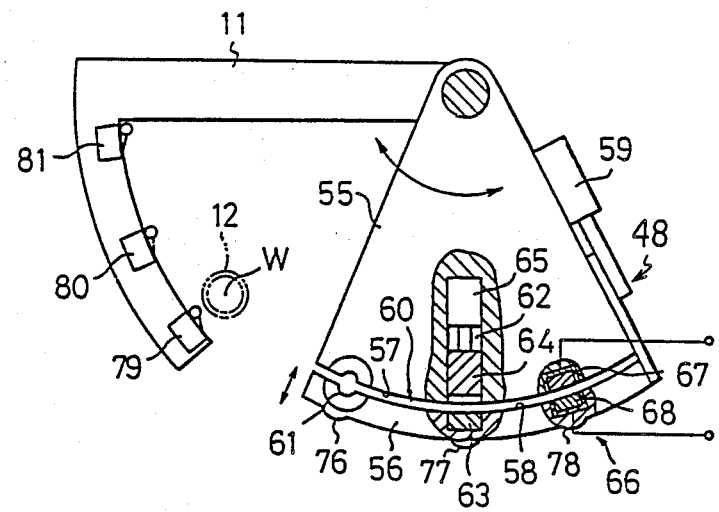
FIG. 4 is a sectional plan view showing the portion surrounding the wire-treating unit of the electric discharge machining apparatus.

As shown in FIGS. 1, 3 and 4, a wire-treating unit 48 is arranged between the upper wire guide member 12 and the work table 10. The wire-treating unit 48 is vertically driven relative to the upper wire guide member 12 by a vertical drive device arranged on the supporting frame 11, for example, a movable rod 50 of an air cylinder device 49. A motor 51 for turning the wire-treating unit 48 in the horizontal direction is arranged on the supporting frame 11, and a gear 53 secured to an output shaft 52 of the motor 51 is engaged with a gear 54 which is slidably key-coupled with the movable rod 50 of the cylinder device 49. The wire-treating unit 48 is rotated and driven in the horizontal direction around the central axis of the movable rod 50 by the motor 51.

The wire-treating unit 48 comprises a fan-shaped base block 55 secured to the movable rod 50 of the cylinder device 49 and a movable block 56. The outer side face 57 of the base block 55 is extends in the circumferential direction around the rotation center of the wire-treating unit 48. The movable block 56 has an inner side face 58 shaped to be fitted with the counter side face 57 of the base block 55. An operating device for connecting and disconnecting the inner side face 58 of the movable block 56 to and from the outer side face 57 of the base block 55, for example, an air cylinder device 59, is mounted on the base block 55. A slit 60 that can be opened and closed is defined by the outer side face 57 of the base block 55 and the inner side face 58 of the movable block 56.

Figure 5:
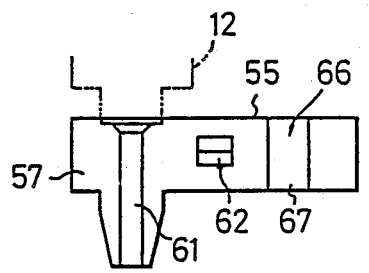
FIG. 5 is a side view of a base block of the wire-treating unit shown in FIG. 3.

As shown in FIG. 5, the wire-treating unit 48 has a longitudinal nozzle hole 61 that can be connected to the lower end of the wire passage 13 of the upper wire guide member 12 The nozzle hole 61 comprises a pair of semi-cylindrical grooves formed on the outer side face 57 of the base block 55 and the inner side face 58 of the movable block 56, respectively. When the slit 60 is closed, the nozzle hole 61 is opened only at its upper and lower parts.

Figure 6:
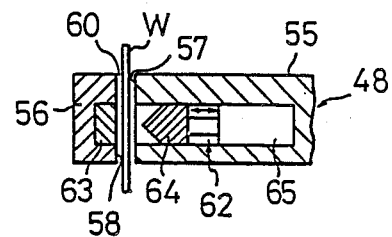
FIG. 6 is a sectional view showing a portion surrounding a wire-cutting device disposed in the wire-treating unit shown in FIG. 3.

As shown in FIGS. 4 through 6, the wire-treating unit 48 comprises a wire-cutting device 62 for cutting the wire electrode W within the slit 60. In the present embodiment, the wire-cutting device 62 comprises a cutter receiver 63 secured to the movable block 56 and a cutter blade 64 which is advanced and withdrawn relative to the cutter receiver 63 by an operating device 65 such as a solenoid or an air cylinder device.

Figure 7:
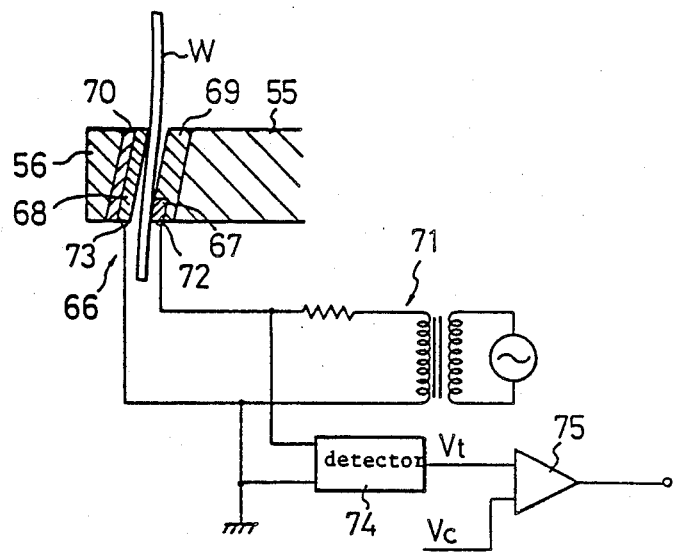
FIG. 7 is a partial sectional structure view of a wire-detecting device arranged in the wire-treatin unit shown in FIG. 3.

Furthermore, the wire-treating unit 48 comprises a wire detecting device 66 for detecting the end of the wire electrode W within the slit 60. As shown in FIGS. 4 and 7, the wire-detecting device 66 has a pair of inclined contact elements, that is electrodes 67 and 68, and the contact elements 67 and 68 are secured to the outer side face 57 of the base block 55 and the inner side face 58 of the movable block 56, respectively, through insulating members 69 and 70. Both the terminals 72 and 73 of an alternating power circuit 71 are connected to the contact elements 67 and 68, and a detector 74 is connected to both the terminals 72 and 73 to detect and output the difference between the absolute values of voltages of both the terminals 72 and 73. The output Vt of the detector 74 is compared with a reference voltage Vc by a comparator 75. When the wire electrode W is present between the contact elements 67 and 68, since the contact elements 67 and 68 are electrically connected to each other by the wire electrode W, the voltage difference between the terminals 72 and 73 is substantially zero. On the other hand, when the wire electrode W is not present between the contact elements 67 and 68, a voltage Vt having an absolute value larger than the reference voltage Vc is generated between the contact elements 67 and 68, and therefore, the output of the comparator 75 is changed.

Referring to FIG. 4, three dogs 76, 77, and 78 are mounted on the periphery of the movable block 56 of the wire-treating unit 48, and three switches 79, 80, and 81 are arranged on the supporting frame 11 for supporting the upper wire guide member 12 to detect the dogs 76, 77, and 78. When the nozzle hole 61 is located just below the upper wire guide member 12, only one switch 79 detects the dog 76, and when the wire-cutting device 62 is located just below the upper wire guide member 12, two switches 79 and 80 detect the dogs 76 and 77, respectively. When the contact elements 67 and 68 of the wire-detecting device 66 are located just below the upper wire guide member 12, the three switches 79 through 81 detect the dogs 76 through 78, respectively.

In the electric discharge machining apparatus of the wire-cutting type having the above-mentioned structure, at the time of the electric discharge machining operation, the wire-treating unit 48 is withdrawn apart from the wire electrode W string between the upper and lower wire guide members 12 and 14, and the wire electrode W is continuously fed out downward by the wire feed rollers 26 and 27. The spray liquid is continuously supplied to the wire passages 13 and 15 of the upper and lower wire guide member 12 and 14 and injected toward the work piece P from the interiors of the wire passages 13 and 15. In a taper machining operation, the position of the upper wire guide member 12 is controlled with respect to move in the horizontal direction relative to the lower wire guide member 14 so that the wire electrode W is string and tilted at a predetermined angle.

When the machining position of the workpiece P is changed to a different separate position, the wire electrode W must be once cut and the wire electrode W string at a new position between the wire guide members 12 and 14. In this case, the wire-treating unit 48 is turned clockwise in FIG. 4 by the motor 51 and the wire electrode W is introduced into the slit 60 in the opened state. The wire-treating unit 48 is stopped when the wire-cutting device 62 arrives at the position just below the upper wire guide member 12. Then, the wire-cutting device 62 is actuated to cut the wire electrode W in the slit 60. The wire-treating unit 48 is then turned counterclockwise in FIG. 4 and the wire-treating unit 48 is stopped when the nozzle hole 61 arrives at the position just below the upper wire guide member 12. Then, the slit 60 is closed by the operating device 58 and, simultaneously, the side portion of the nozzle hole 61 which has received the cut end of the wire electrode W is closed. The wire-treating unit 48 is lifted up by the cylinder device 49 and the nozzle hole 61 is connected to the lower end of the upper wire guide member 12.

Then, the spray liquid is supplied into the wire passage 13 of the upper wire guide member 12 through the third opening and closing valve 43 and the supply pipe 34 by the second pump 41 (see FIG. 2). Since the first and second opening and closing valves 39 and 40 are closed, the spray liquid is not supplied to the wire passage 15 of the lower wire guide member 14. The spray liquid supplied into the wire passage 15 of the upper wire guide member 12 is injected downward through the interior of the nozzle hole 61 of the wire-treating unit 48. The wire electrode W is fed out downward by the injecting force of the spray liquid. The wire electrode W is guided together with the spray liquid to the wire recovery devce 29 through the machining hole or groove of the work piece P and the wire passage 15 of the lower wire guide member 14, and the end of the wire electrode W is gripped by the belt delivery device 30 of the wire recovery device 29. Since the wire electrode W is restrained by the flow of the spray liquid, the wire electrode W is smoothly guided through the fine hole or groove of the oork piece P or the narrow passage 15 of the wire guide member 14. Preferably, when the wire electrode W is fed out downward by the spray liquid, the wire electrode W is released from the wire feed rollers 26 and 27. For this purpose preferably the wire feed rollers 26 and 27 are disposed openably and movably in the horizontal direction.

When the automatic stringing of the wire electrode W is completed, the wire-treating unit 48 is brought down and separated from the upper wire guide member 12. Furthermore, the slit 60 is opened and the wire-treating unit 48 is withdrawn apart from the wire electrode W.

When the wire-electrode W is broken by abnormal discharge or the like, the electric discharge machining is stopped by a wire break detector (not shown). Then, the wire-treating unit 48 is moved clockwise in FIG. 4 and is stopped when the contact elements 67 and 68 of the wire-detecting device 66 arrives at the position just below the upper wire guide member 12. Then, the wire electrode W is lifted up by the wire feed rollers 26 and 27. The lift-up of the wire electrode W by the wire feed rollers 26 and 27 is stopped when the broken end of the wire electrode W is detected by the wire detecting device 66. The wire-treating unit 48 is then turned and moved counterclockwise in FIG. 4 and the rotation is stopped when the wire-cutting device 62 arrives at the position just below upper wire guide member 12. Then, the wire electrode W is cut at a part above the broken end by the wire-cutting device 62. Since the end portion of the wire electrode broken in the discharge region is ordinarily curled and roughened on the surface, the subsequent automatic stringing operation cannot be smoothly performed. In the present embodiment, since the wire electrode W is cut above the broken end, subsequent automatic stringing can be smoothly performed. After the operation of cutting the wire electrode W by the wire-cutting device 62, the automatic stringing operation is carried out in the above-mentioned manner.

Figure 8:
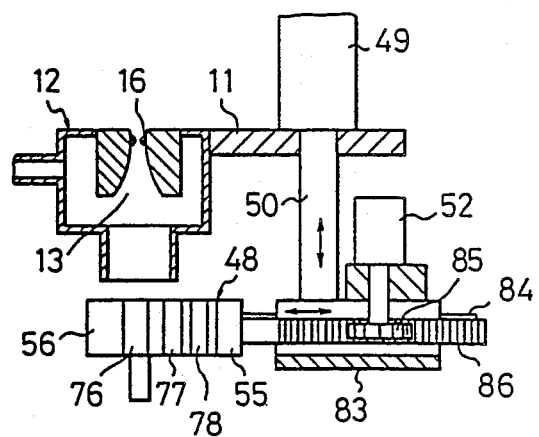
FIG. 8 is a longitudinally sectional side view of a portion surrounding a wire-treating unit of an electric discharge machining apparatus of the wire-cutting type, which illustrates a second embodiment of the present invention.
Figure 9:
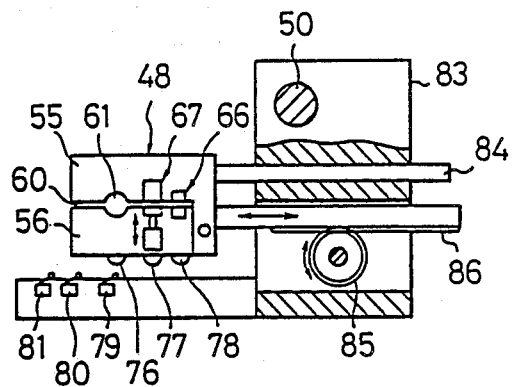
FIG. 9 is a partial sectional plan view of the wire-treating unit shown in FIG. 8.

FIGS. 8 and 9 illustrate the second embodiment of the present invention. In these figures, the same structural elements as in the first embodiment are represented by the same reference numerals. The wire-treating unit 48 is arranged linearly movably in the horizontal direction relative to the upper wire guide member 12. More specifically, the cylinder device 49 is mounted on the supporting frame 11 supporting the upper wire guide member 12, and the base block 55 of the wire-treating unit 48 is supported so that it is linearly movable in the horizontal direction through a guide rod 84 on a supporting block 83 attached to the movable rod 50 of the cylinder device 49. A pinion 85 is secured to the output shaft 52 of the motor 51 mounted on the supporting block 55, and a rack 86 secured to the base block 55 is engaged with the pinion 85. The slit 60 formed between the base block 55 and the movable block 56 extends linearly. The three switches 79 through 81 for detecting the dogs 76 through 78 mounted on the movable block 56 are arranged on the supporting block 83 to perform the same operation as in the first embodiment. Accordingly, in this second embodiment the same effect as attained in the first embodiment is similarly attained.

Figure 10:
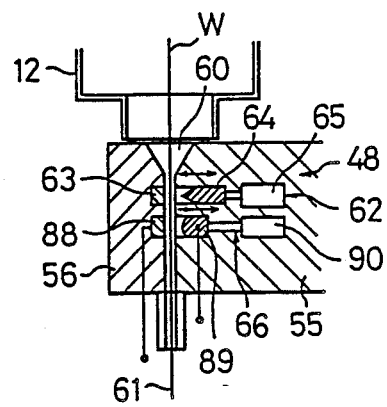
FIG. 10 is a sectional view of a main part of a wire-treating unit of an electric discharge machining apparatus of the wire-cutting type, which illustrates a third embodiment of the present invention.

FIG. 10 illustrates the third embodiment of the present invention. In FIG. 10, the same structural elements as in the first embodiment are represented by the same reference numerals. In the present embodiment, the wire-detecting device 66 is arranged below the wire-cutting device 62. The wire-detecting device 66 comprises a stationary contact element 88 and a movable contact element 89, and the movable contact element 89 is advance and withdrawn relative to the stationary contact element 88 by an operating device 90 such as a solenoid. When the wire electrode W is broken, the wire-cutting device 62 and the wire-detecting device 66 are located just below the upper wire guide member 12, and the wire electrode W is lifted up in the state gripped by the stationary contact element 88 and the movable contact element 89. When the broken end of the wire electrode W is detected by the wire-detecting apparatus 66, the wire electrode W is cut above the wire-detecting device 66 by the wire-cutting device 62. In the present embodiment, it is sufficient if two dogs and two switches are arranged for detecting the stop position of the wire-treating unit 48.

Figures 11A, 11B, 11C:
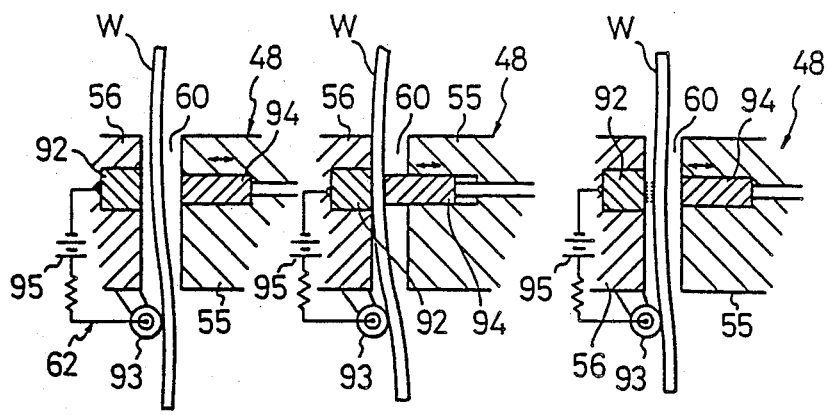
FIGS. 11a through 11c are sectional views showing the operation state of a wire-detecting device of an electric discharge machining apparatus of the wire-cutting type, which illustrate a fourth embodiment of the present invention.

FIG. 11a through 11c illustrate the fourth embodiment of the present invention. In these figures, the same structural elements as in the first embodiment are represented by the same reference numeral. In the present embodiment, a modification of the wire-cutting device 62 is employed. Namely, the wire-cutting device 62 comprises a stationary electrode 92 secured to one inner wall of the wire-treating unit 48, which defines the slit 60, a contact element 93 to be placed in contact with the wire electrode W within the slit 60, and a movable push rod 94 for pressing the wire electrode W within the slit 60 against the stationary electrode 92. A direct current power circuit 95 is connected between the stationary electrode 92 and the contact element 93.

In the present embodiment, when the wire electrode W is cut, the wire electrode W received in the slit 60 is temporarily pressed against the stationary electrode 92 by the push rod 94 as shown in FIG. 11b. Then, as shown in FIG. 11c, the push rod 94 is withdrawn to separate the wire electrode W from the stationary electrode 92, whereby an arc discharge is generated between the wire electrode W in contact with the contact element 93 and the stationary electrode 92 and the wire electrode W is heated and softened. The softened wire electrode W is gripped below the wire-cutting device 62 and is pulled up above the wire-cutting device 62, whereby the wire electrode W can be easily cut. The wire electrode W may be gripped by a pair of blocks 19 and 21 (see FIG. 1) illustrated in the first embodiment, or these blocks may be separately disposed below the wire-treating unit 48. Pull-up of the wire electrode W may be accomplished by wire feed rollers 26 and 27 (see FIG. 1) illustrated in the first embodiment.

Figure 12:
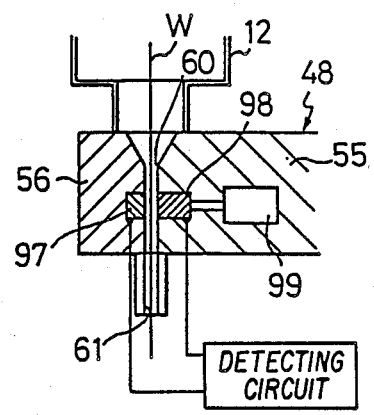
FIG. 12 is a sectional structure view of a main part of a wire-treating unit of an electric discharge machining apparatus of the wire-cutting type, which illustrates a fifth embodiment of the present invention.

FIG. 12 illustrates the fifth embodiment of the present invention. In FIG. 12, the same structural elements as in the first embodiment are represented by the same reference numerals. In the present embodiment, the wire-cutting device 62 comprises a stationary electrode 97 and a movable electrode blade 98 which is advanced and withdrawn relative to the stationary electrode 97 by an operating device 99 such as a solenoid, and a wire-detecting circuit 100 of the wire-detecting device 66 is connected to the stationary electrode 97 and the movable electrode blade 98. This detecting circuit 100 has the same structure as that of the detecting circuit connected to the contact elements 67 and 68 shown in FIG. 7.

In the present embodiment, when the wire electrode W is broken, the wire-treating unit 48 is moved so that the wire-cutting device 62 is located at the position just below the upper wire guide member 12, the movable electrode blade 98 is advanced by a predetermined quantity, and the stationary electrode 97 and the movable electrode blade 98 fall into contact with the wire electrode W introduced in the slit 60. In this state, the wire electrode W is pulled up. When the broken end of the wire electrode W has escaped upward from between the stationary electrode 97 and the movable electrode blade 98, since the stationary electrode 97 is electrically disconnected from the movable electrode blade 98, the output of the detecting circuit 100 is changed over and pull-up of the wire electrode W is stopped. Then, the movable electrode blade 98 is once withdrawn by the operating device 99 and the wire electrode W is fed out downward by a predetermined quantity. Then, the movable electrode blade 98 is advanced again and the wire electrode W is cut between the movable electrode blade 98 and the stationary electrode 97. Note, where the wire-cutting device 62 is integrated with the wire detecting device 66 as in the present embodiment, the cutting mechanism utilizing an arc discharge, as shown in FIGS. 11a through 11c, may be used as the wire-cutting device 62.

Figure 13:
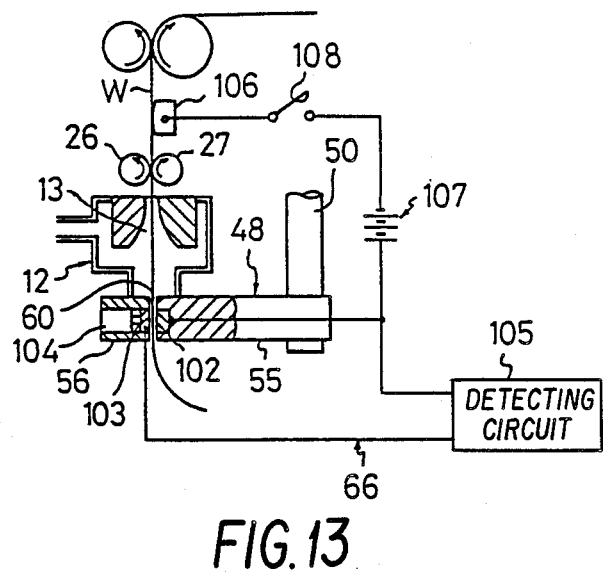
FIGS. 13 through 15 are sectional structure views of a main part of an electric discharge machining apparatus of the wire-cutting type provided with a mechanism for straightening curls or bends of a broken wire electrode, which illustrate sixth, seventh, and eighth embodiments of the present invention, respectively.

FIG. 13 illustrates the sixth embodiment of the present invention in which curls or bends of the broken wire electrode are straightened. In FIG. 13, the same structural elements as in the first embodiment are represented by the same reference numerals as used in the first embodiment. In the present embodiment, the wire-detecting device 66 comprises a stationary contact element 102, a movable contact element 103 which is advanced and withdrawn relative to the stationary contact element 102 by an operating device 104 such as a solenoid and a wire-detecting circuit 105, similar to the circuit shown in FIG. 7, which is connected to the stationary contact element 102 and the movable contact element 103. A contact element 106 to be placed in contact with the wire electrode W is arranged above the wire-detecting device 66. A heating power circuit 107 provided with a switch 108 is connected to the contact element 106 and the stationary contact element 102.

In the present embodiment, the wire electrode W wtthin the slit 60 of the wire-treating unit 48 is pulled up by the wire feed rollers 26 and 27 in the state gripped by the contact elements 102 and 103. At this point, the switch 108 is closed to heat the wire electrode W. Since the wire electrode W is under tension while being heated and annealed, the wire electrode W curled by breaking is straightened.

Figure 14:
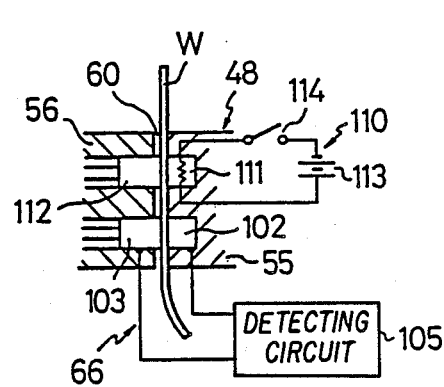
Figure 15:
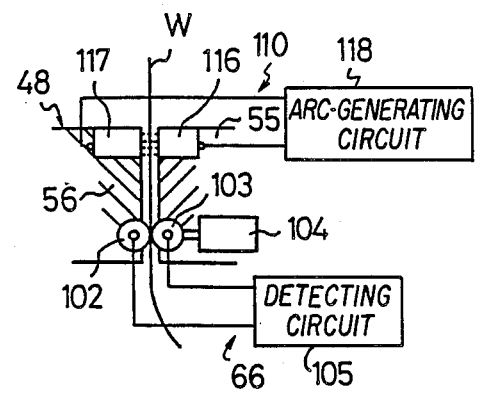

FIGS. 14 and 15 illustrate the seventh and eighth embodiments of the present invention in which curls or bends of the broken wire electrode W are straightened. In these figures, the structural elements as in the first and sixth embodiments are represented by the same reference numerals as used in the first and sixth embodiments. In the embodiment illustrated in FIG. 14, a heater 110 for heating the wire electrode W is separately disposed above the wire-detecting device 66. The heater 110 comprises a stationary heating member 111 and a movable pressing member 112 which is advanced and withdrawn relative to the stationary heating member 111 by an operating device, and a heating power circuit 113 provided with a switch 114 is connected to a heat generator mounted on the stationary heating member 111. The wire electrode W within the slit 60 of the wire-treating unit 48 is pulled up in the state gripped by both the members 111 and 112. Since the wire electrode W which is under tension is heated and annealed by the heater 110, bends or curls of the wire electrode W are straightened.

In the embodiment illustrated in FIG. 15, the heater 110 is provided with two spaced electrodes 116 and 117 arranged above the wire-detecting device 66, and an arc-generating circuit 118 is connected to both the electrodes 116 and 117. The wire electrode W within the slit 60 of the wire-treating unit 48 is pulled up in the state gripped by the contact elements 102 and 103 of the wire-detecting device 66, whereby a tension is given to the wire electrode W. Since the wire electrode W is annealed by arc discharge generated between both the electrodes 116 and 117 of the heater 110, bends or curls of the wire electrode W are straightened.

The present invention has been described with reference to the embodiments illustrated in the accompanying drawings, but the present invention is not limited by these embodiments and it is obvious to experts in the art that various modifications and changes can be made within the scope of the invention set forth in the claims.

CAPABILITY OF EXPLOITATION IN INDUSTRY

As is apparent from the foregoing illustration, according to the present invention, there is provided an electric discharge machining apparatus of the wire-cutting type in which, by using the wire-cutting device and nozzle hole of the wire-treating unit disposed movably in the horizontal direction between the upper wire guide member and the work table and the injecting force of the spray liquid supplied into the wire passage of the upper wire guide member, cutting of the wire electrode and automatic stringing of the wire electrode can be performed quickly and accurately.

We claim:

1. An electric discharge machining apparatus of the wire-cutting type, which comprises a work table for holding a workpiece thereon, upper and lower wire guide members arranged above and below the work table, each having a wire passage formed therethrough in the vertical direction, means for supplying a wire electrode to be passed through the wire passages of the upper and lower guide members, a wire feed device disposed above the upper wire guide member to provide downward and upward feeding movement to the wire electrode, spray liquid feed means for feeding a spray liquid into the wire passage of the upper wire guide member, and further comprising:

a wire treating unit movable in the horizontal direction relative to the upper guide member and the work table to traverse the wire electrode extending downward from the wire passage of the upper wire guide member, said wire treating unit comprising a base block and a movable block provided with means for moving the block so as to approach to and separate from the base block closed between said two blocks, the slit having formed therein a nozzle hole which can be connected to the lower end of wire passage of the upper wire guide member by vertical movement of the wire treating unit so that the spray liquid supplied in the wire passage of the upper wire guide member is injected toward said nozzle hole for directing the end of a wire electrode thereinto, the wire-treating unit further comprising wire detecting means for detecting the ned of the wire electrode extending downward from the wire passage of the upper wire guide member between the base block and the movable block, and wire cutting means for cutting the wire electrode between the base block and the movable block, and means for controlling said horizontal traverse of said wire-treating unit to selectively position each of said nozzle hole, said wire detecting means and said wire cutting means in alignment with said wire electrode.

2. An electric discharge machining apparatus of the wire-cutting type according to claim 1, wherein the nozzle hole comprises a pair of semi-cylindrical grooves formed on confronting inner walls of the base block and the movable block, which define the slit.

3. An electric discharge machining apparatus of the wire-cutting type according to claim 1, wherein the wire-cutting means comprises a cutter receiver exposed in the slit, a cutter blade having a sharp top end and confronting the cutter receiver and a driver for approaching and separating the cutter blade to and from the cutter receiver.

4. An electric discharge machining apparatus of the wire-cutting type according to claim 1, wherein the wire-cutting means comprises a first electrode exposed in the slit, a second electrode arranged below the first electrode and in contact with the wire electrode, a discharge-generating circuit connected to the first and second electrodes and pressing means for pressing the wire electrode against the first electrode to induce an electric discharge between the first electrode and the wire electrode.

5. An electric discharge machining apparatus of the wire-cutting type according to any one of claims 1, 3 or 4, wherein the wire-detecting means comprises a pair of contact electrodes mounted on the base block and the movable block, respectively, and a detecting circuit for detecting the presence or absence of a short circuit formed between the contact electrodes by the wire electrode.

6. An electric discharge machining apparatus of the wire-cutting type according to claim 3, wherein the wire-detecting means comprises a pair of contact electrodes mounted on the base block and the movable block, respectively, and a detecting circuit for detecting the presence or absence of a short circuit formed between the contact circuit by the wire electrode, and the cutter blade and cutter receiver of the wire-cutting means constitute a pair of said contact electrodes.

7. An electric discharge machining apparatus of the wire-cutting type according to claim 1, wherein the nozzle hole, the wire-cutting means and the wire-detecting means are arranged in a line along the horizontal longitudinal direction of the slit in the state where they are separated from one another.

8. An electric discharge machining apparatus of the wire-cutting type according to claim 6, wherein the wire-treating unit can be stopped at a first position where the slit separates aside from the wire electrode extending downward from the wire passage of the upper wire guide member, at a second position where the nozzle hole receives the wire electrode, at a third position where the wire-cutting means cuts the wire electrode and at a fourth position at which the wire-detecting means detects the wire electrode.

9. An electric discharge machining apparatus of the wire-cutting type according to claim 1, wherein the nozzle hole and the wire-cutting means are aranged apart from each other along the horizontal longitudinal direction of the slit and the wire-detecting means is disposed blow the wire-cutting means.

10. An electric discharge machining apparatus of the wire-cutting type according to claim 4, wherein the wire-treating unit can be stopped at a first position where the slit separates from the wire electrode extending downward from the wire passage of the upper wire guide member, at a second position where the nozzle hole receives the wire electrode and at a third position where the wire-cutting means cuts the wire electrode.

11. An electric discharge machining apparatus of the wire-cutting type according to claim 1, wherein the wire-treating unit is attached to a shaft extending in the vertical direction and is rotatable in the horizontal direction around the axis of said shaft, and the slit is extended in the arcuate form with the axis of said shaft being the center.

12. An electric discharge machining apparatus of the wire-cutting type according to claim 1, wherein the wire-treating unit is linearly movable in the horizontal direction.

13. An electric discharge machining apparatus of the wire-cutting type according to claim 1, wherein the wire-treating unit further comprises means for controllably moving said unit in the vertical direction so that the nozzle hole is placed in contact with and is separated from the upper wire guide member.

14. An electric discharge machining apparatus of the wire-cutting type according to claim 1, wherein the wire-treating unit comprises means co-operating with the wire feed device to straighten curls or bends of the wire electrode.

15. An electric discharge machining apparatus of the wire-cutting type according to claim 14, wherein the means for straightening curls or bends of the wire electrode comprises means for gripping the wire electrode between the base block and the movable block and heating means for heating the wire electrode between said gripping means and the wire feed device.

* * * * *